(12) United States Patent
Parias Cruz

(10) Patent No.: US 8,092,072 B2
(45) Date of Patent: Jan. 10, 2012

(54) DISPOSABLE CUP WITH A ROTATING SPOON

(76) Inventor: Alejandro Parias Cruz, Seville (ES)

( * ) Notice: Subject to any disclaimer, the term of this patent is extended or adjusted under 35 U.S.C. 154(b) by 831 days.

(21) Appl. No.: 11/997,093

(22) PCT Filed: Jun. 14, 2006

(86) PCT No.: PCT/ES2006/000350
§ 371 (c)(1),
(2), (4) Date: Jul. 29, 2008

(87) PCT Pub. No.: WO2007/012679
PCT Pub. Date: Feb. 1, 2007

(65) Prior Publication Data
US 2009/0147615 A1  Jun. 11, 2009

(30) Foreign Application Priority Data
Jul. 28, 2005  (ES) ................. 200501836 U

(51) Int. Cl.
*B01F 7/16* (2006.01)
(52) U.S. Cl. .............. 366/129; 366/248; 366/347
(58) Field of Classification Search ......... 220/212, 220/212.5; 366/130, 245–248, 242, 244, 366/129, 347
See application file for complete search history.

(56) References Cited

U.S. PATENT DOCUMENTS

| | | | | |
|---|---|---|---|---|
| 420,262 A * | 1/1890 | Boemermann | ............. | 366/247 |
| 430,783 A * | 6/1890 | Mulford | ............. | 366/245 |
| 497,045 A * | 5/1893 | Barker | ............. | 366/247 |
| 876,633 A * | 1/1908 | Gray | ............. | 366/248 |
| 906,934 A * | 12/1908 | Rightmyer | ............. | 366/312 |
| 912,842 A * | 2/1909 | Griffiths | ............. | 366/98 |
| 1,296,326 A * | 3/1919 | Scollon | ............. | 366/242 |
| 1,399,296 A * | 12/1921 | Feeney | ............. | 366/245 |
| 1,879,731 A * | 9/1932 | Buckley | ............. | 366/247 |
| 2,485,303 A * | 10/1949 | Marcus | ............. | 366/247 |

(Continued)

FOREIGN PATENT DOCUMENTS
DE   100 11 726   2/2001
(Continued)

OTHER PUBLICATIONS
Mikuni. Machine Translation of JP 2001-120414. 5 pages. (2001).*

*Primary Examiner* — Tony G Soohoo
(74) *Attorney, Agent, or Firm* — Merchant & Gould P.C.

(57) ABSTRACT

The invention relates to a disposable cup with a rotating spoon comprising a container (1), a spoon (3), a lid (2) with a hole for the passage of the spoon and a sleeving (4) which can be coupled to one another. The spoon (3) consists of a rod having a paddle-shaped flare at one end and a series of bends near the other end which define a C-shaped layout, the central branch of which has a rib (12) with an intermediate groove and passes through the hole of the lid (2), the end part projecting with crank functions. A radial slit (7) with a length and width equal to or greater than the section of the paddle starts from the hole of the lid. The lid further has a mouth piece or drinking area (8) next to its periphery. The invention is applicable in café, hotel and restaurant establishments for drinking take-away hot beverages, such as coffee.

2 Claims, 3 Drawing Sheets

U.S. PATENT DOCUMENTS

| | | | | |
|---|---|---|---|---|
| 2,719,703 | A * | 10/1955 | Boakes | 366/244 |
| 2,736,536 | A * | 2/1956 | Banowitz | 366/248 |
| 2,814,473 | A * | 11/1957 | Kroll | 366/247 |
| 2,946,299 | A * | 7/1960 | Clifford | 366/98 |
| 3,295,836 | A * | 1/1967 | Langella | 366/248 |
| 3,417,972 | A * | 12/1968 | Conway | 241/199.12 |
| 3,544,080 | A * | 12/1970 | Lawrence | 366/248 |
| 3,704,007 | A * | 11/1972 | Kroeger | 366/248 |
| 3,894,723 | A * | 7/1975 | Sanders et al. | 366/248 |
| 4,049,243 | A * | 9/1977 | Kramer | 366/98 |
| 4,197,018 | A * | 4/1980 | Groen, Jr. | 366/248 |
| 4,422,770 | A * | 12/1983 | Geible | 366/248 |
| 4,460,279 | A | 7/1984 | Krasney | |
| 4,763,567 | A * | 8/1988 | Dalquist et al. | 99/323.5 |
| 5,586,676 | A * | 12/1996 | Lynd | 220/212 |
| 5,842,633 | A | 12/1998 | Nurse | |
| 5,857,615 | A | 1/1999 | Rose | |
| 6,286,754 | B1 | 9/2001 | Stier et al. | |
| 2005/0056654 | A1 * | 3/2005 | Leung | 220/737 |
| 2009/0147615 | A1 * | 6/2009 | Parias Cruz | 366/130 |

FOREIGN PATENT DOCUMENTS

| | | |
|---|---|---|
| JP | 2004 073345 | 3/2004 |
| JP | 2001 120414 | 11/2006 |

* cited by examiner

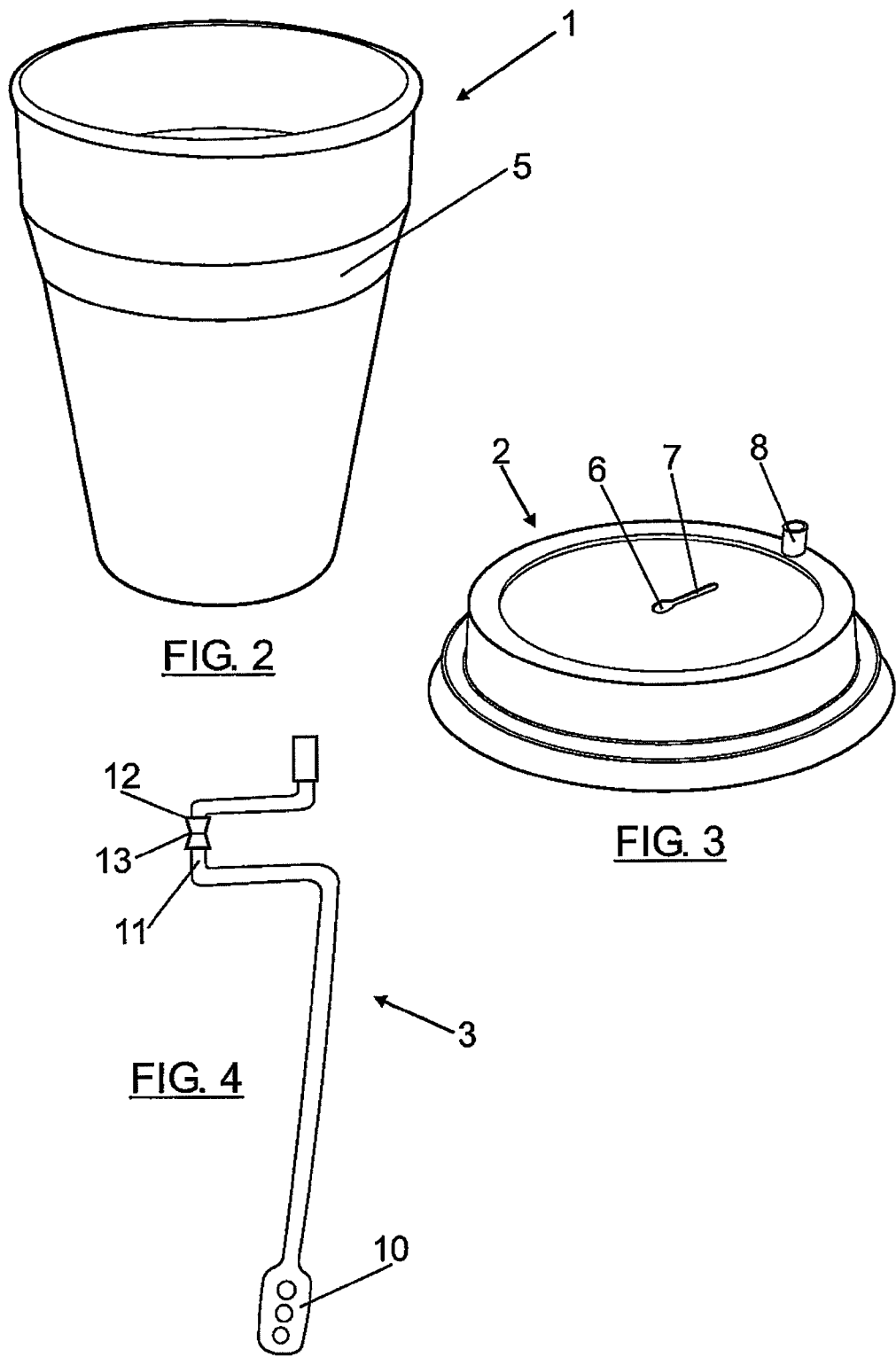

DISPOSABLE CUP WITH A ROTATING SPOON

FIELD OF THE INVENTION

The present invention relates to a disposable cup for drinking beverages, such as coffee, which are served in different café, hotel and restaurant establishments and having on one side a drinking area for drinking the beverage and on the other side a hole for introducing a spoon and being able to thus stir the liquid.

BACKGROUND OF THE INVENTION

Disposable cups formed by four separate parts, the container, lid, spoon and sleeving for covering the container in the event that the beverage being provided is very hot, can be found today in a number of establishments in the café, hotel and restaurant industry, especially in those establishments serving take-away hot beverages, such as coffee for example. In said cups, only the container, the lid and the sleeving can be coupled to one another, the spoon being independent from the rest of the parts. This has a number of drawbacks, since once the liquid is served in the container and the lid is coupled, said lid must be lifted again in order to stir the content or pour any new substance into the container.

DESCRIPTION OF THE INVENTION

The invention relates to a disposable cup with a rotating spoon according to claim 1. Preferred embodiments of the method and of the system are defined in the dependent claims.

The disposable cup comprises a container, a spoon, a lid with a hole for the passage of the spoon and a sleeving, all of which can be coupled to one another and made of a preferably disposable material.

The container has a shape which allows a more comfortable and safer coupling to the user's hand.

The spoon consists of a rod having a paddle-shaped flare at one end and a series of bends at the other end which define a C-shaped layout, the central branch of which passes through the hole of the lid, the end part projecting with crank functions. A radial slit with a length and width equal to or greater than the section of the paddle starts from the hole of the lid.

The spoon can have in the central branch of the C-shaped span a rib with an intermediate groove that can be adjusted to the edge of the hole.

The lid can further have a mouth piece or drinking area next to its periphery.

The sleeving consists of a laminar part having a slightly trapezoidal contour extending from one of its smaller sides into arrow head shaped tabs, while near the other opposite smaller side it has transverse slits sized to receive the tabs.

The cup object of the invention provides a number of advantages in relation to existing cups. First, since the spoon is coupled to the fixing device of the lid, it can rotate 360° in both directions, completely stirring the liquid of the container. The shape of the cup further allows being held perfectly, more naturally and more safely in the user's hand. The sleeving can also be adapted to the size of the cup, according to whether it is small, medium or large sized, and advertising of the establishment or of associated companies can be added. Finally, the drinking area better adapts to the user's mouth since it has a "short straw" type shape, allowing pleasant and safe contact.

BRIEF DESCRIPTION OF THE DRAWINGS

To better understand the invention, an embodiment of the invention is very briefly described below as an illustrative and non-limiting example thereof. To that end, reference is made to the attached drawings in which:

FIG. 2 shows the container of the cup.

FIG. 3 shows the lid of the cup.

FIG. 4 shows the spoon of the cup.

DETAILED DESCRIPTION OF THE INVENTION

Figure 1:
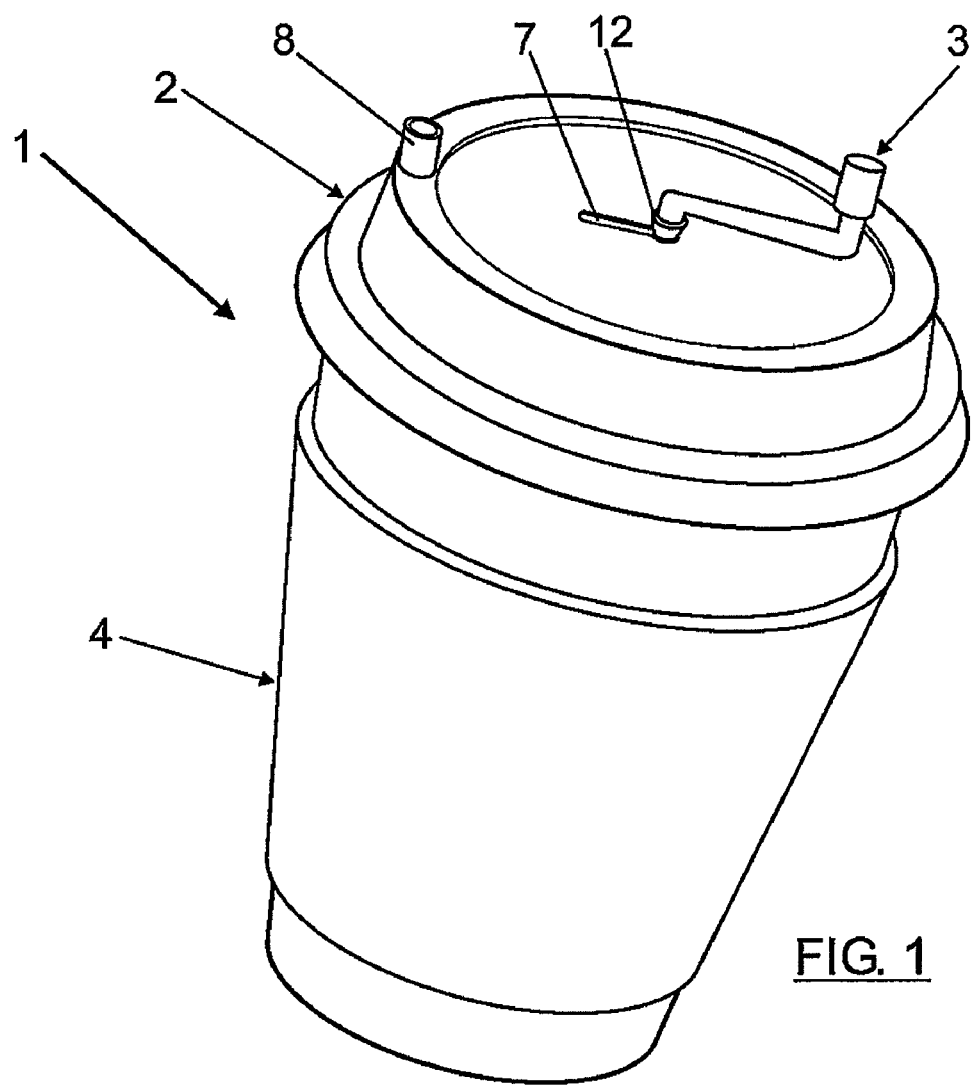
FIG. 1 shows the disposable cup object of the invention, with all its elements already assembled.

In view of FIG. 1 the four elements forming the disposable cup object of the invention can be seen: a container 1, a lid 2, a spoon 3 and a sleeving 4.

In FIG. 2 the container 1, having a shape 5 which allows a more comfortable and safer coupling to the user's hand, can be seen.

FIG. 3 shows the lid 2, having a round hole 6 in the center with a radial slit 7 having a flexible opening with a length and width suitable for introducing the spoon 3 in a clean and easy manner. The central hole 6 has a fixing shape that can perfectly adapt to the fixing shape for fixing the spoon, both parts fitting together by means of slight pressure until coupling them to the fixing device. The hole for drinking, a mouth piece or drinking area 8, is located at one of the ends of the lid, slightly raised and with a small hole for achieving a better adaptation to the user's mouth.

The third element forming the invention is the spoon 3, which is represented in FIG. 4. It is a rod having at one of its ends a paddle-shaped flare 10 in which a series of small holes can be made so as to facilitate the flow of the liquid, and it has a series of bends near the other end which define a C-shaped layout, the central branch 11 of which passes through the hole 6 of the lid, the end part projecting, performing crank functions once the spoon has been coupled to the lid 2. This end of the spoon 3 has a flexible base so that the user can bend it to his or her liking. In said central branch 11 the spoon has a holding shape consisting of a rib 12 with an intermediate groove 13 that can be adjusted to the edge of the hole 6 of the lid 2.

Figure 5:
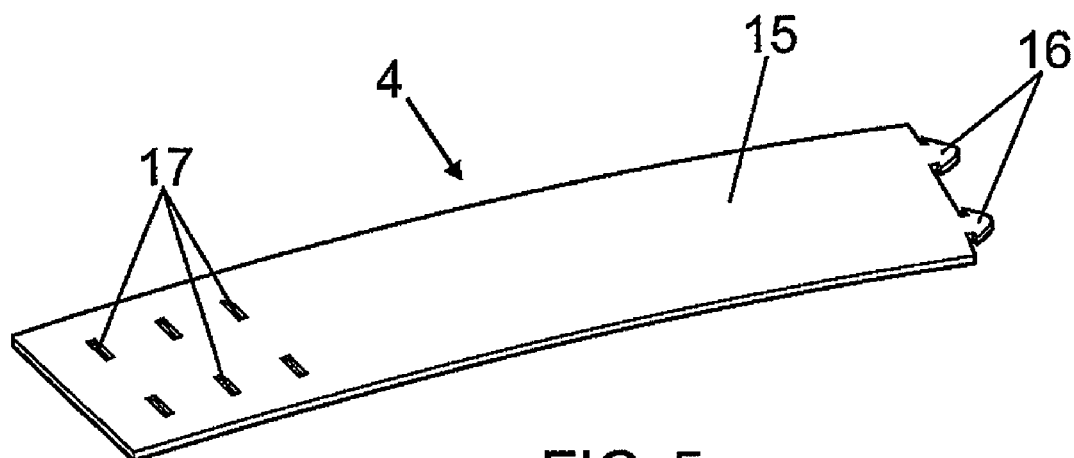
FIG. 5 shows the sleeving of the cup without winding.
Figure 6:
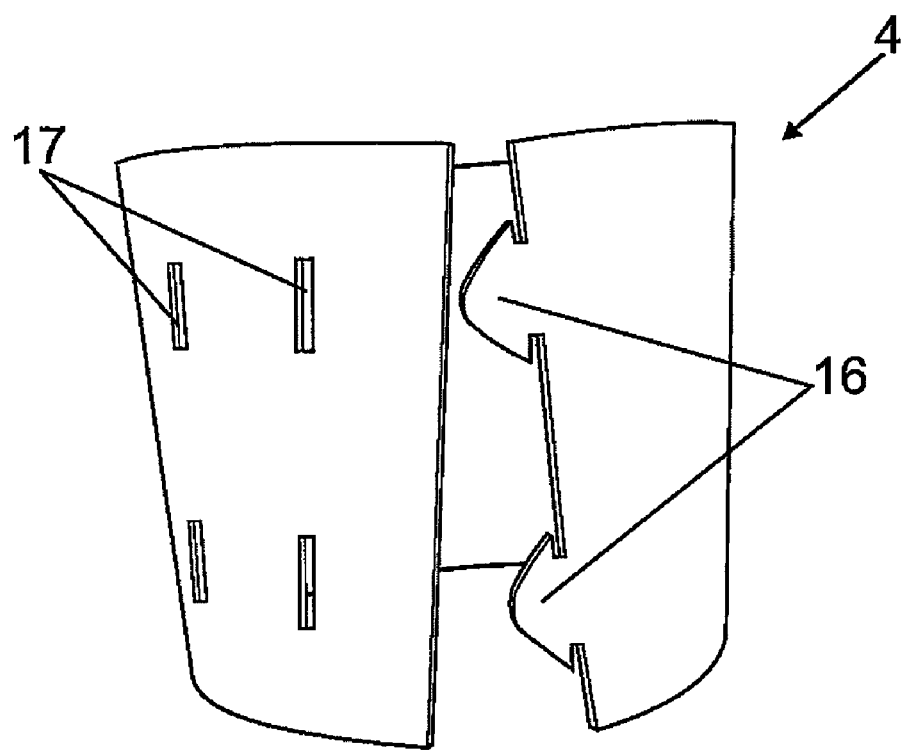
FIG. 6 shows the sleeving of the cup in the winding process.

FIGS. 5 and 6 show the sleeving 4, usually made of cardboard, which is wound around the container to prevent burning one's hands in the event that the content is hot. Said sleeving 4 consists of a laminar part 15 having a slightly trapezoidal contour which extends from one of its smaller side edges into arrowhead-shaped tabs 16 while near the other opposite smaller side it has transverse slits sized to receive the tabs 16. The tabs 16 will be introduced in determined slits depending on the size of the cup.

The process of applying the invention is as follows: the sleeving 4 is coupled to the container 1 and the liquid is poured into the latter. Then the container 1 is closed with the lid 2 and the spoon 3 is introduced through the opening that the lid 2 has in the central part thereof and is coupled as a result of the holding shape that the hole 6 of the lid has and the holding shape that the spoon 3 has. The spoon 3 is fixed to the lid 2, allowing rotating the spoon 360° and thus stirring the liquid content.

The invention claimed is:

1. A disposable cup with a rotating spoon comprising a container, a spoon and a lid with a hole for the passage of the spoon which can be coupled to one another, wherein the spoon comprises a rod having a paddle-shaped flare at one end and a series of bends near the other end which define a C-shaped layout, the central branch of which passes through the hole of the lid, the end part projecting with crank functions, the spoon having in said central branch a rib with an intermediate groove that can be adjusted to the edge of the hole, wherein the lid includes a radial slit with a length and width equal to or greater than the section of the paddle starts from the hole of the lid, and wherein the lid includes a mouth piece or drinking area next to a periphery of the lid.

2. A disposable cup with a rotating spoon according to claim 1, further comprising a sleeving, the sleeving comprising a laminar part having a slightly trapezoidal contour extending from a smaller side into arrowhead-shaped tabs, while near an other opposite smaller side, the sleeving has transverse slits sized to receive the tabs.

* * * * *